United States Patent
Kim et al.

(10) Patent No.: US 9,550,420 B2
(45) Date of Patent: Jan. 24, 2017

(54) PARKING ASSISTANCE SYSTEM AND METHOD FOR CONTROLLING THE SAME

(71) Applicant: Hyundai Motor Company, Seoul (KR)

(72) Inventors: Soo Ryun Kim, Hwaseong-si (KR); Jong Won Hwang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/851,454

(22) Filed: Sep. 11, 2015

(65) Prior Publication Data
US 2016/0144856 A1  May 26, 2016

(30) Foreign Application Priority Data

Nov. 24, 2014  (KR) .......................... 10-2014-0164498

(51) Int. Cl.
| | | |
|---|---|---|
| *B60K 35/00* | (2006.01) | |
| *B60W 50/08* | (2012.01) | |
| *B62D 15/02* | (2006.01) | |

(52) U.S. Cl.
CPC ............ *B60K 35/00* (2013.01); *B60W 50/082* (2013.01); *B62D 15/027* (2013.01)

(58) Field of Classification Search
CPC ..... B60W 50/082; B60W 40/10; B60R 1/025; B60R 1/00; B60Q 9/005; H04N 7/183; G08B 6/00; B62D 15/028; G08C 17/00
USPC .......... 701/36, 41; 359/843; 340/438, 932.2; 348/148
See application file for complete search history.

(56) References Cited

U.S. PATENT DOCUMENTS

| | | | |
|---|---|---|---|
| 5,957,232 A | 9/1999 | Shimizu et al. | |
| 2004/0119610 A1* | 6/2004 | Maemura | B60Q 9/005 340/932.2 |
| 2006/0181790 A1* | 8/2006 | Jones, III | B60R 1/025 359/843 |
| 2009/0259365 A1* | 10/2009 | Rohlfs | B62D 15/028 701/41 |
| 2011/0057782 A1* | 3/2011 | Chundrlik, Jr. | B60R 1/00 340/436 |
| 2013/0342339 A1* | 12/2013 | Kiefer | G08B 6/00 340/438 |

(Continued)

FOREIGN PATENT DOCUMENTS

| | | |
|---|---|---|
| JP | 06-321026 A | 11/1994 |
| JP | 2014-125195 A | 7/2014 |

(Continued)

*Primary Examiner* — Yuri Kan
(74) *Attorney, Agent, or Firm* — McDermott Will & Emery LLP

(57) ABSTRACT

A parking assistance system and a method for controlling the same are disclosed. The parking assistance system includes a parking-mode input unit, a parking-associated functioning unit having a plurality of parking-associated systems, a setting unit for selecting parking-associated systems that are operated, and a controller configured to control the respective parking-associated systems by receiving an input signal through the parking-mode input unit. The method for controlling the parking assistance system includes transmitting a parking-mode input signal by turning on a parking-mode input unit, recognizing that a parking action is ready to be executed through the parking-mode input signal, and controlling a set of parking-associated functioning units according to a predetermined condition stored in a setting unit.

9 Claims, 7 Drawing Sheets

(56) References Cited

U.S. PATENT DOCUMENTS

| | | | | |
|---|---|---|---|---|
| 2014/0156112 A1* | 6/2014 | Lee | ……………… | G08C 17/00 701/2 |
| 2015/0085117 A1* | 3/2015 | Chang | ……………… | H04N 7/183 348/148 |
| 2015/0197254 A1* | 7/2015 | Wysietzki | ………… | B60W 40/10 701/41 |

FOREIGN PATENT DOCUMENTS

| JP | 2014-125196 A | 7/2014 |
|---|---|---|
| KR | 10-2009-0022129 A | 3/2009 |
| KR | 10-2011-0129009 A | 12/2011 |
| KR | 10-2012-0022185 A | 3/2012 |
| KR | 10-2013-0057782 A | 6/2013 |
| KR | 10-1346969 B1 | 1/2014 |
| KR | 10-2014-0020424 A | 2/2014 |

* cited by examiner

PARKING ASSISTANCE SYSTEM AND METHOD FOR CONTROLLING THE SAME

CROSS-REFERENCE TO RELATED APPLICATION

The priority of Korean patent application No. 10-2014-0164498 filed on Nov. 24, 2014, the disclosure of which is hereby incorporated by reference in its entirety, is claimed.

TECHNICAL FIELD

Embodiments of the present invention relate to a technology for controlling various parking assistance systems developed for parking convenience of a driver.

BACKGROUND

In general, various systems for parking assistance such as, for example, a Parking Assist System (PAS), an Around View Monitoring (AVM) system, and Reverse-gear tilt-down outside mirrors, detect the driver's parking intention using an R (reverse)-gear switch signal of a shift lever or a direct switch-on/off action, or the like, so that the above-mentioned parking assistance systems can be activated. In this case, respective input signals are different from each other. For example, the R-gear switch signal is not received as input during a front view parking mode, and therefore it is difficult for individual parking assistance systems to be effectively turned on or off at an appropriate time. Therefore, there is a need to determine whether each parking assistance system will be turned on or off prior to execution of the parking mode.

In addition, the auto hold function of the vehicle needs to simultaneously control on/off functions of each parking assistance system during the parking mode. If the auto hold function is activated, the auto hold function can be conveniently used in a general city driving mode. However, when a driver attempts to park a vehicle during the auto hold function activation, a vehicle halt state is continuously maintained after the driver steps on the brake pedal. This can cause inconvenience to the driver during parking. In that case, when the driver reattempts to park the vehicle, the driver has to turn off the auto hold function by stepping on the accelerator pedal.

The driver may feel uneasy doing this, resulting in reduction of vehicle safety. In order to address the above-mentioned problem, the driver has to turn off the auto hold function when attempting to park a vehicle, and also has to turn on the auto hold function when the driver does not park the vehicle, resulting in greater inconvenience of use.

SUMMARY

Various embodiments of the present invention are directed to providing a parking assistance system and a method for controlling the same that substantially obviate one or more problems due to limitations and disadvantages of the related art.

An embodiment of the present invention relates to a technology for simultaneously controlling the on/off actions of not only the parking assistance system configured to receive the driver's parking intention using a single button (i.e., a parking mode button) so as to affect the parking action, but also other driving convenience systems, so that the driver can more effectively and conveniently park his or her vehicle in a parking space.

In accordance with an aspect of the embodiment, a parking assistance system includes a parking-mode input unit, a parking-associated functioning unit having a set of parking-associated systems, a setting unit for selecting parking-associated systems that are operated, and a controller configured to control the respective parking-associated systems by receiving an input signal through the parking-mode input unit.

The parking-mode input unit may be implemented as one button installed in a vehicle.

The setting unit may be predetermined through a user setting menu and changeable by a driver.

The parking assistance system may further include a display unit configured to display a parking image indicating a parking state on a vehicle cluster when an input signal is applied to the parking-mode input unit.

The parking-associated functioning unit may include a parking assist system (PAS), a rear parking assist system (RPAS), an around view monitoring system (AVM), a reverse-gear tilt-down outside mirrors function, an auto hold function, and other parking-associated functions.

In accordance with another aspect of the embodiment, a method for controlling a parking assistance system includes transmitting a parking-mode input signal by turning on a parking-mode input unit, recognizing that a parking action is ready to be executed through the parking-mode input signal, and controlling a plurality of parking-associated functioning units according to a predetermined condition stored in a setting unit.

The predetermined condition may be changeable through a user setting menu.

The method may further include, upon controlling the parking-associated functioning units, switching off the parking-mode input unit.

The method may further include, upon transmission of the parking-mode input signal, displaying a parking image indicating a parking state on a vehicle cluster.

The parking-associated functioning unit may include a parking assist system (PAS), a rear parking assist system (RPAS), an around view monitoring system (AVM), a reverse-gear tilt-down outside mirrors function, an auto hold function, and other parking-associated functions.

It is to be understood that both the foregoing general description and the following detailed description of the present disclosure are exemplary and explanatory and are intended to provide further explanation of the disclosure as claimed.

DETAILED DESCRIPTION

Reference will now be made in detail to the embodiments of the present invention, examples of which are illustrated in the accompanying drawings. Wherever possible, the same reference numbers will be used throughout the drawings to refer to the same or like parts.

Figure 1:
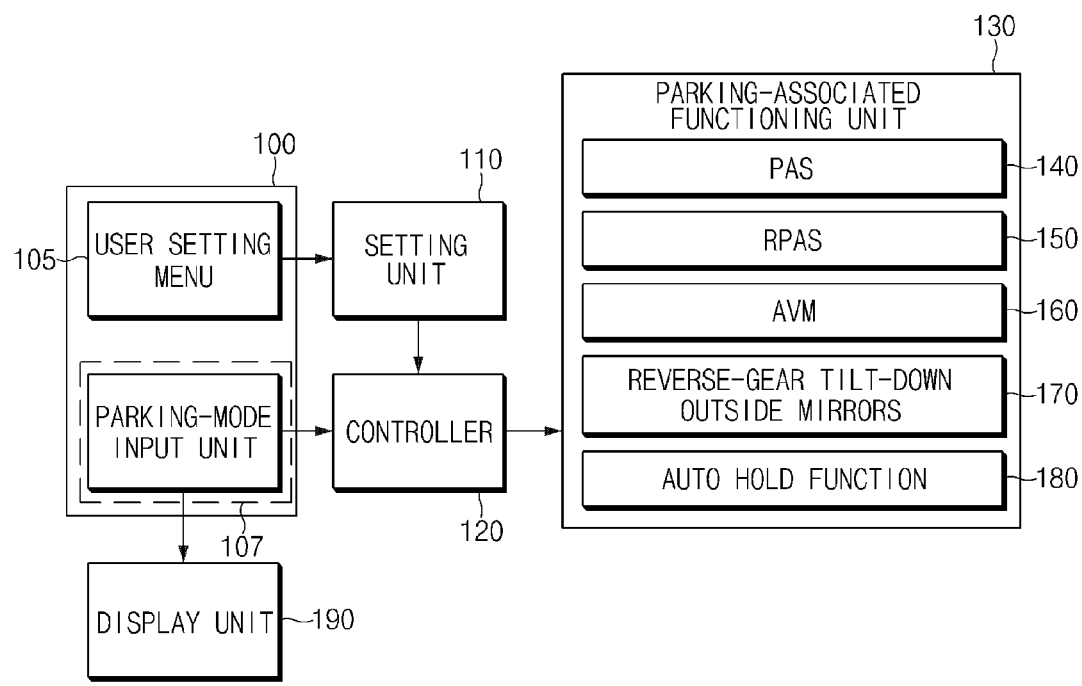
FIG. 1 is a block diagram illustrating a parking assistance system according to an embodiment of the present invention.

FIG. 1 is a block diagram illustrating a parking assistance system according to an embodiment of the present invention.

Referring to FIG. 1, the parking assistance system includes a parking-mode input unit 107, a parking-associated functioning unit 130, a setting unit 110, a controller 120, and a display unit 190.

Figure 3:
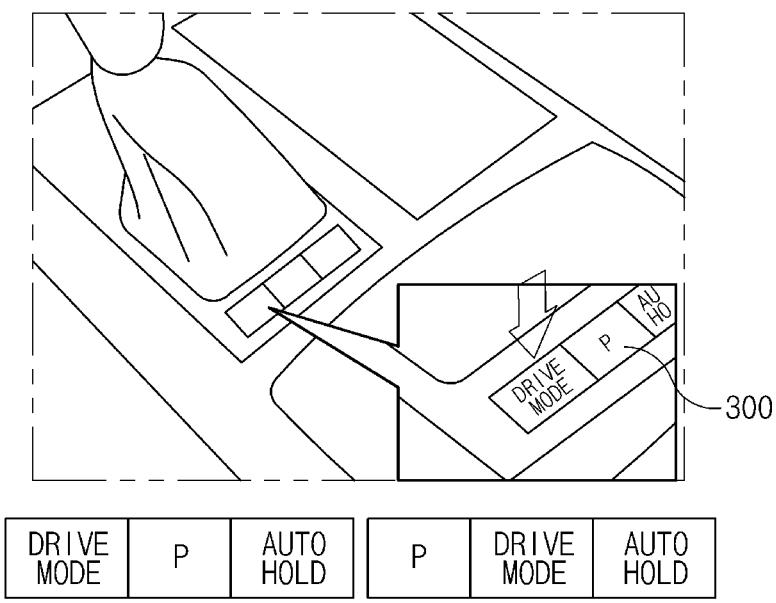
FIGS. 3 and 4 are enlarged views illustrating some constituent parts of a parking assistance system according to an embodiment of the present invention.

The parking-mode input unit 107 may directly receive the driver's parking intention through a parking mode button 300 (shown in FIG. 3). The parking mode button 300 may be arranged near a shift lever as shown in FIG. 3. For example, a drive mode button (DRIVE MODE) and an auto hold (AUTO HOLD) button may also be located below the shift lever, as shown in FIG. 3. The parking mode button (P) 300 implemented as a push button may be located adjacent to the two buttons (i.e., DRIVE MODE and AUTO HOLD). Therefore, the driver can easily access the parking mode button 300 when attempting to park the vehicle.

Figure 4:
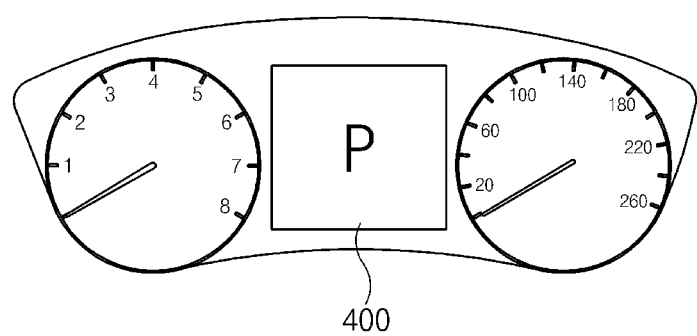

When the parking-mode input unit 107 receives the parking mode input signal and the parking mode starts, the parking mode button 300 (of FIG. 3) is lighted on and at the same time the letter "P" indicating the parking is displayed on a vehicle cluster screen 400 (shown in FIG. 4) of the display unit 190. Since the letter "P" is displayed on the display unit 190, the driver who pushes the parking mode button 300 can easily recognize whether a current mode normally enters the parking mode.

The parking-associated functioning unit 130 may include multiple parking-associated systems. The parking-associated systems may include a parking assist system (PAS) 140, a rear parking assist system (RPAS) 150, an around view monitoring system (AVM) 160, a reverse-gear tilt-down outside mirrors function 170, an auto hold function system 180, or the like.

The PAS 140 includes a front-view sensor and a rear-view sensor, and detects the presence or absence of other vehicles in the front and rear directions using the front-view sensor and the rear-view sensor. When the presence of vehicles in the front and rear directions is determined, the PAS 140 may warn the driver of this dangerous situation.

When the reverse (R) gear of the shift lever is activated, the RPAS 150 may detect the presence or absence of a vehicle in a rear-view dead zone using the rear-view sensor.

The AVM 160 may provide various view modes using a front-view camera, a rear-view camera, and both side-view cameras of the vehicle.

When the AVM 160 is not turned on, the front-view mode or the rear-view mode is activated according to a predetermined condition.

Assuming that the shift lever is shifted to a drive (D) gear, the vehicle starts driving, and the vehicle speed is less than 20 kilometers per hour (kph), the front-view mode starts operation.

In addition, when the shift lever is shifted to the reverse (R) gear, the rear-view mode starts operation.

The reverse-gear tilt-down outside mirror function 170 may allow a reflective surface of the outside mirror to move downward, so that it can allow the driver to view a rear-downward view image.

Assuming that the auto hold function 180 is activated, after the driver steps on a brake pedal to brake the vehicle on the condition that the shift lever is located at the D-gear mode, the R-gear mode, the N (neutral)-gear mode, or the manual mode, although the driver takes a foot off the brake pedal after the vehicle comes to a halt, the vehicle halt state is continuously maintained. Otherwise, if the driver steps on the accelerator pedal, the auto hold function 180 is automatically released, so that the vehicle can start driving.

Among several parking-associated systems contained in the parking-associated functioning unit 130, information regarding driver parking habits or information regarding some parts needed for such parking can be selectively turned on or off by the setting unit 110 in such a manner that information regarding the selective on/off states is established in the setting unit 110. The setting unit 110 may be established by a user setting menu 105. The setting unit 110 may establish multiple functions to be turned on/off when the parking mode button is pushed, and this establishing condition may be directly changed by a driver.

For example, assuming that the driver wants to turn on the PAS 140 and the AVM 160 during the vehicle parking and also wants to turn off the R-gear tilt-down outside mirrors function 170 and the auto hold function 180, the setting condition may be changed by the user setting menu 105.

The controller 120 may receive an input signal through the parking-mode input unit 107, and may control individual systems contained in the parking-associated functioning unit 130 according to the setting information of the setting unit 110.

As described above, the on/off actions of various systems embedded in the vehicle can be properly established before the driver parks the vehicle, so that the driver can easily control the systems without the necessity of independently operating each switch of the respective system.

Figure 2:
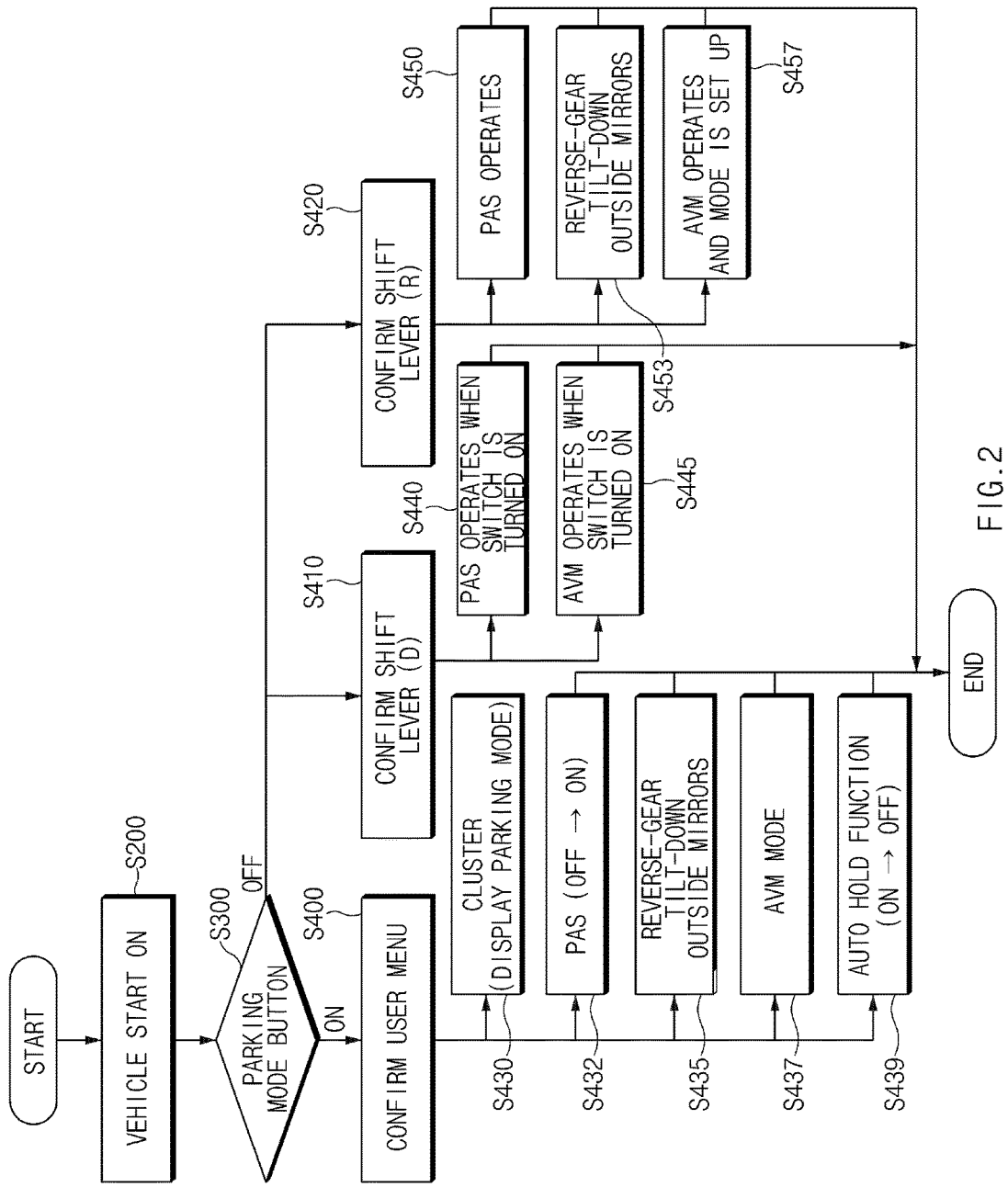
FIG. 2 is a flowchart illustrating a method for controlling a parking assistance system according to an embodiment of the present invention.

FIG. 2 is a flowchart illustrating a method for controlling the parking assistance system according to an embodiment of the present invention. A method for controlling the parking assistance system will hereinafter be described with reference to FIG. 2.

Referring to FIG. 2, the vehicle starting key or button is turned on in step S200.

Thereafter, the on/off states of the parking mode button are confirmed in step S300. If the parking mode button is turned on, the parking mode signal is input to the parking-mode input unit 107 shown in FIG. 1.

If the parking mode signal is input to the parking-mode input unit 107, predetermined user setting menus of the setting unit 110 shown in FIG. 1 may be confirmed in step S400.

Thereafter, the letter "P" is displayed on a vehicle cluster screen 400 (shown in FIG. 4) of the vehicle in such a manner that the driver can recognize that the current mode has entered the parking mode, in step S430.

The above-mentioned parking-associated functioning unit 130 of FIG. 1 may be controlled according to a condition of the predetermined user setting menus.

For example, the PAS 140 of FIG. 1 is transitioned from an OFF state to an ON state in step S432. The R-gear tilt-down outside mirrors function 170 of FIG. 1 remains turned on in step S435. In addition, the AVM 160 of FIG. 1 starts operation in step S437. Moreover, the auto hold function system 180 of FIG. 1 is transitioned from the ON state to the OFF state in step S439. In this case, the condition for controlling each parking-associated functioning unit 130 may be changed by the user setting menu 105 shown in FIG. 1.

Meanwhile, if in step S300 the parking mode button is turned off according to the parking mode button confirmation result, the shift lever is confirmed in steps S410 and S420.

When it is determined that the shift lever is located at the D-gear mode (i.e., D mode) in step S410, the PAS 140 and the AVM 160 are operated when the switch is turned on in steps S440 and S445, respectively.

When it is determined that the shift lever is located at the R-gear mode (i.e., R mode) in step S420, the PAS 140 is automatically operated in step S450. The R-gear tilt-down outside mirrors function 170 is operated when the switch is turned on. The AVM 160 is automatically operated. In this case, the front-view mode or the rear-view mode may be established in step S457. Although the parking mode button of the vehicle is not pushed by the driver, the shift gear is confirmed so that respective systems can be operated according to basic operation conditions of the individual parking assistance functions of the vehicle.

FIGS. 5A to 5D illustrate a method for employing the parking assistance system according to an embodiment of the present invention.

Figure 5A:
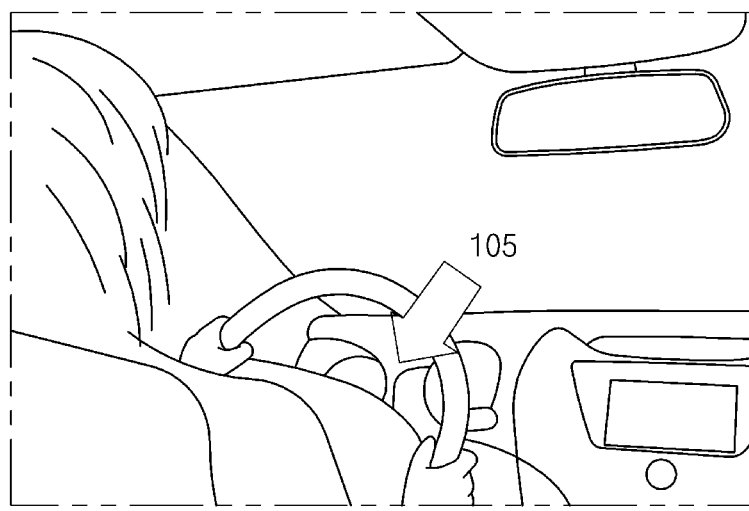
FIGS. 5A to 5D illustrate a method for employing a parking assistance system according to an embodiment of the present invention.

Referring to FIG. 5A, the driver may pre-establish functions to be turned on or off when the parking mode button is established through the user setting menu 105.

Figure 5B:
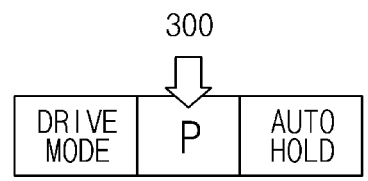

Referring to FIG. 5B, if the vehicle enters the parking lot upon completion of vehicle travel, the driver pushes the parking mode button P (300) prior to execution of the parking.

Figure 5C:
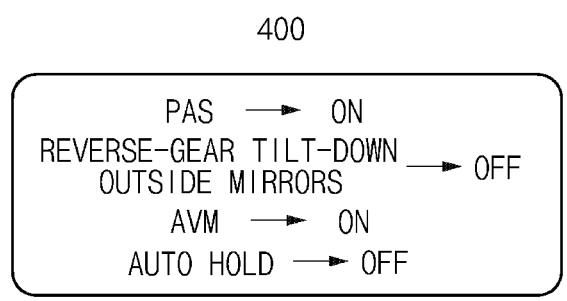

Thereafter, if the driver pushes the parking mode button, the letter "P" indicating entering the parking mode may be displayed on the cluster screen 400 as shown in FIG. 5C. If a screen image indicating the parking mode starting is displayed, an alarm sound indicating the parking mode starting state may also be generated as necessary. If the parking mode is started, respective parking assistance functioning units may be simultaneously shifted according to a predetermined condition as shown in FIG. 5A.

For example, when the driver attempts to park the vehicle, the PAS 140 and the AVM 160 may be turned on, the R-gear tilt-down outside mirrors function 170 and the auto hold function 180 may be turned off. The above-mentioned condition may be changed through the user setting menu 105.

Figure 5D:
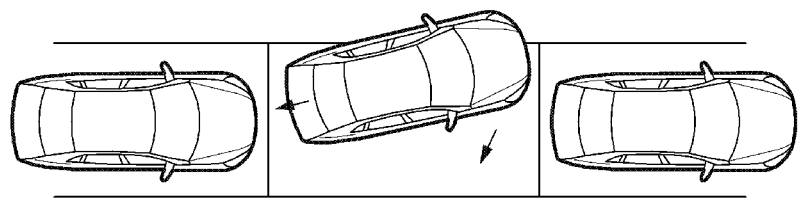

Thereafter, after the driver parks the vehicle, the driver pushes the parking mode button once more so that the parking mode is turned off. After the shift lever is shifted to the parking (P) gear by the driver, the driver can exit the vehicle as shown in FIG. 5D.

As is apparent from the above description, if the driver pushes the parking mode button embedded in the vehicle before parking the vehicle so that the parking mode is started, the on/off actions of the parking assistance function embedded in the vehicle can be properly established, and the driver can easily control individual systems using only one button without the necessity of independently operating each switch of the respective systems.

In addition, the embodiments can simultaneously retrieve predetermined on/off information of respective parking assistance systems before the driver parks the vehicle, so that the environment appropriate for the parking mode can be achieved or released by turning on or off the parking mode button. In addition, the parking mode button is located near the shift lever, resulting in greater driver convenience.

Therefore, the embodiments can correctly receive the driver's parking intention using only one button (i.e., the parking mode button), and can simultaneously control the on/off actions of not only the parking assistance system, but also other driving convenience systems capable of affecting the parking, so that the driver can more effectively and conveniently park his or her vehicle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A parking assistance system comprising:
   a parking-mode input unit receiving a parking mode signal through a parking mode button;
   a parking-associated functioning unit having a plurality of parking-associated systems;
   a setting unit setting on or off states of the plurality of parking-associated systems for a parking mode; and
   a controller configured to simultaneously control each of the plurality of parking-associated systems according to the on or off states when a current mode is entered the parking mode by the parking mode signal.

2. The parking assistance system according to claim 1, wherein the setting unit presets and changes the on or off states of the plurality of parking-associated systems for a parking mode through a user setting menu.

3. The parking assistance system according to claim 1, further comprising:
   a display unit configured to display a parking image, indicating a parking state, on a vehicle cluster when an input signal is applied to the parking-mode input unit.

4. The parking assistance system according to claim 1, wherein the parking-associated functioning unit comprises:
   a parking assist system (PAS), a rear parking assist system (RPAS), an around view monitoring system (AVM), a reverse-gear tilt-down outside mirrors function, an auto hold function, and other parking-associated functions.

5. A method for controlling a parking assistance system comprising:
   presetting on or off states of the plurality of parking-associated systems for a parking mode;
   receiving a parking mode signal through a parking mode button;
   recognizing the on or off states of the plurality of parking-associated systems when a current mode is entered the parking mode by the parking-mode signal; and
   controlling each of the plurality of parking-associated systems simultaneously according to the on or off states.

6. The method according to claim 5, wherein the on or off states changeable through a user setting menu.

7. The method according to claim 5, further comprising:
   upon controlling the parking-associated functioning units, switching off the parking-mode input unit.

8. The method according to claim 5, further comprising:
   upon transmission of the parking-mode input signal, displaying a parking image indicating a parking state on a vehicle cluster.

9. The method according to claim 5, wherein the parking-associated functioning unit includes:
   a parking assist system (PAS), a rear parking assist system (RPAS), an around view monitoring system (AVM), a reverse-gear tilt-down outside mirrors function, and an auto hold function.

* * * * *